United States Patent [19]
LoGalbo et al.

[11] Patent Number: 5,423,059
[45] Date of Patent: Jun. 6, 1995

[54] METHOD FOR ENHANCING SIGNAL QUALITY IN A SIMULCAST COMMUNICATION SYSTEM

[75] Inventors: Robert D. LoGalbo, Bartlett; Bradley M. Hiben, Glen Ellyn; Mark C. Cudak, Mount Prospect, all of Ill.

[73] Assignee: Motorola Inc., Schaumburg, Ill.

[21] Appl. No.: 98,880

[22] Filed: Jul. 29, 1993

[51] Int. Cl.⁶ .............................................. H04B 7/00
[52] U.S. Cl. ..................... 455/51.2; 455/56.1; 375/356
[58] Field of Search ............... 455/51.2, 56.1, 57.1; 375/107

[56] References Cited
U.S. PATENT DOCUMENTS

| | | | |
|---|---|---|---|
| 4,696,051 | 9/1987 | Breeden | 455/51.2 |
| 4,709,401 | 11/1987 | Ackerberg | 455/57.1 |
| 5,105,439 | 4/1992 | Bennett et al. | 455/51.2 |
| 5,155,859 | 10/1992 | Harris | 455/51.2 |
| 5,239,672 | 8/1993 | Kurby et al. | 455/57.1 |
| 5,263,177 | 11/1993 | Schieve et al. | 455/51.2 |

*Primary Examiner*—Reinhard J. Eisenzopf
*Assistant Examiner*—Andrew Faile
*Attorney, Agent, or Firm*—Christopher P. Moreno; Timothy W. Markinson

[57] ABSTRACT

In a simulcast communication system (100), a communication unit (110–115) may request enhanced coverage area services by transmitting a request for enhanced signal quality to a central simulcast controller (101). Upon receipt, the central simulcast controller (101) identifies, based on information pertaining to the location of the communication unit, a set of transmitters (102–109) to enhance coverage in the area of the communication unit. The central simulcast controller determines enhanced coverage area delays for each of the transmitters and adjusts the respective delays of each transmitter such that transmitted signal quality is enhanced at the location of the communication unit.

18 Claims, 3 Drawing Sheets

METHOD FOR ENHANCING SIGNAL QUALITY IN A SIMULCAST COMMUNICATION SYSTEM

FIELD OF THE INVENTION

The present invention relates generally to simulcast communication systems and, in particular, to a method for enhancing signal quality in localized areas within such systems.

BACKGROUND OF THE INVENTION

Simulcast communication systems are known to comprise transmitters, a plurality of communication units, such as in-car mobile and/or hand-held portable radios, and a central simulcast controller. In such a system, a minimum number of transmitters, typically distributed throughout a large geographic region, are synchronized under the control of the central simulcast controller to provide the most uniform radio frequency (RF) coverage area possible. By fixing the transmission delays between the transmitters, communication units may travel over very large distances and still retain the ability to communicate, at acceptable quality levels, within the simulcast system.

It is known, however, that various locations within the coverage area of a simulcast system can provide widely fluctuating reception quality due to superposition of RF waves of varying amplitudes and delays. When a communication unit operates in close proximity to a transmitter, reception by the communication unit is clear because interference from the other transmitters is overpowered by the nearby transmitter. In those areas where signals from multiple transmitters are substantially equal in power, the quality of received communications can vary due to differential delays between the multiple signals. That is, when the differential delays are substantially zero, the multiple signals constructively interfere with each other thereby providing good audio reception for communication units within the area. Significant differential delays within such areas can cause the multiple signals to destructively interfere with each other, thus reducing the quality of received signals to the point of complete unintelligibility. Such delays are caused for a variety of reasons, such as topographical variations within the coverage area. Thus, communication units may travel only small distances and experience dramatic reductions in received audio quality.

A solution to this problem is to increase the transmit power of some of the transmitters to improve reception within the original coverage area. This solution can cause further problems, especially to the power amplifiers (PA) used by the transmitters. Transmitters, and their associated PA's, operating at higher power levels for increased periods of time can cause degraded performance or lead to premature failure. Also, in simulcast systems that transmit an RF modulation scheme of a non-constant envelope, higher operating powers could cause PA's to operate outside their linear range, causing unwanted distortion. Thus, a need exists for a method which allows signal quality to be enhanced in those areas of simulcast systems experiencing low signal quality without the use of higher power levels.

DESCRIPTION OF A PREFERRED EMBODIMENT

Generally, the present invention provides a method for enhancing signal quality within specific areas of a simulcast communication system. This can be accomplished in one of two ways. In a first approach, a communication unit sends a request for enhanced signal quality, including it's current location, to the central simulcast controller. Upon receiving the request, the central simulcast controller discerns the location of the requesting unit. Once the location of the unit is known, the central simulcast controller determines a set of transmitters required for enhancing the coverage area and then calculates a new transmit delay requirement for each transmitter. These newly calculated delay requirements are then passed to the transmitters, such that, with the change in delays, the destructive interference that lowered the signal quality is substantially eliminated.

Another approach calls for the central simulcast controller to monitor the activity of communication units and determine the region requiring enhanced coverage based on the area having the highest density of current communications activity. Upon determining this location, the central simulcast controller would again determine the set of transmitters required for enhancing the coverage area, calculate a new transmit delay requirement for each transmitter, and transmit these newly calculated delays to the transmitters.

Figure 1:
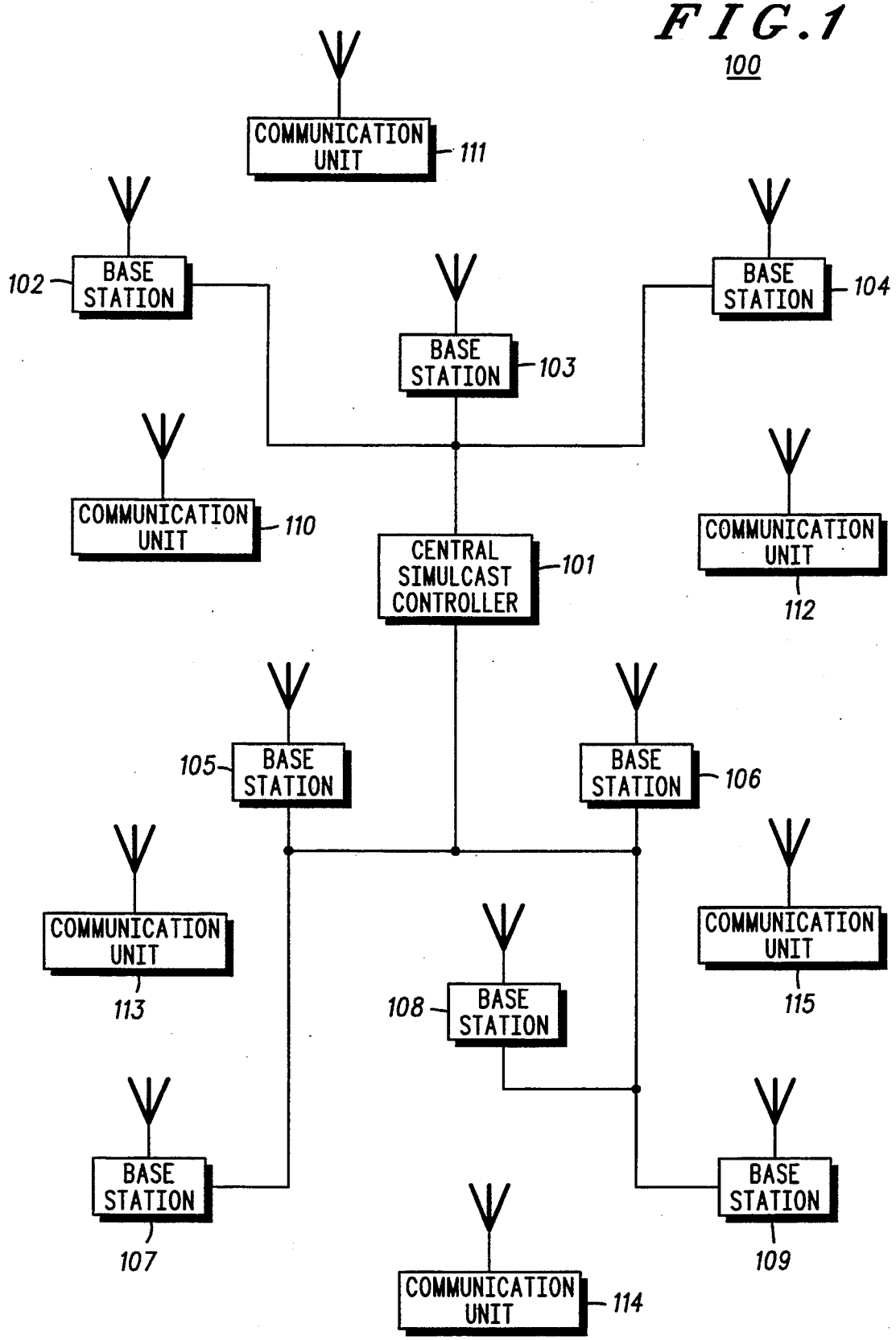
FIG. 1 illustrates a simulcast communication system in accordance with the present invention.

The present invention can be more fully described with reference to FIG.'s 1–3. FIG. 1 illustrates a simulcast communication system (100) that includes a central simulcast controller (101), transmitters (102–109), and a plurality of communication units (110–115). The central simulcast controller (101) may comprise an AstroTAC comparator, manufactured by Motorola Inc., connected to a Global Positioning Satellite (GPS) receiver for absolute timing information. The central simulcast controller (101) may be several microprocessors which process the absolute time information and distribute launch-time-stamped voice or data communications, in the form of digital data packets, over a network. The launch-time stamp informs the transmitters (102–109) when to begin transmitting their respective voice or data packets.

The transmitters (102–109) may be Motorola Quantar Repeaters or Smart Repeaters, capable of transmitting and receiving radio frequency (RF) signals. Each transmitter (102–109) is connected to a local GPS receiver for absolute time references. Each transmitter (102–109) is capable of receiving launch-time-stamped voice or data packets from the central simulcast controller (101) and transmitting the voice or data packets, via an RF channel, at the correct launch time with the aid of the absolute time reference. The communications units (110–115) may be hand-held portable or in-car mobile radios which are capable of receiving and transmitting RE signals.

While FIG. 1 illustrates the simulcast communication system (100) utilizing a specific network configuration, the system (100) may be configured as a star system, a ring system or any other configuration, provided that the central simulcast controller (101) has a communication path capable of carrying voice and/or data to each of the transmitters (102–109). Furthermore, the physical communication links between the central simulcast controller (101) and the transmitters (102–109) may be modems utilizing public telephone lines, dedicated leased digital lines, microwave point-to-point links, fiber optic links, or any combination thereof. Regardless of the simulcast system (100) configuration and the manner in which it is implemented, the present invention will enhance signal quality in specific areas of the system as discussed with reference to FIG.'s 2 and 3.

Figure 2:
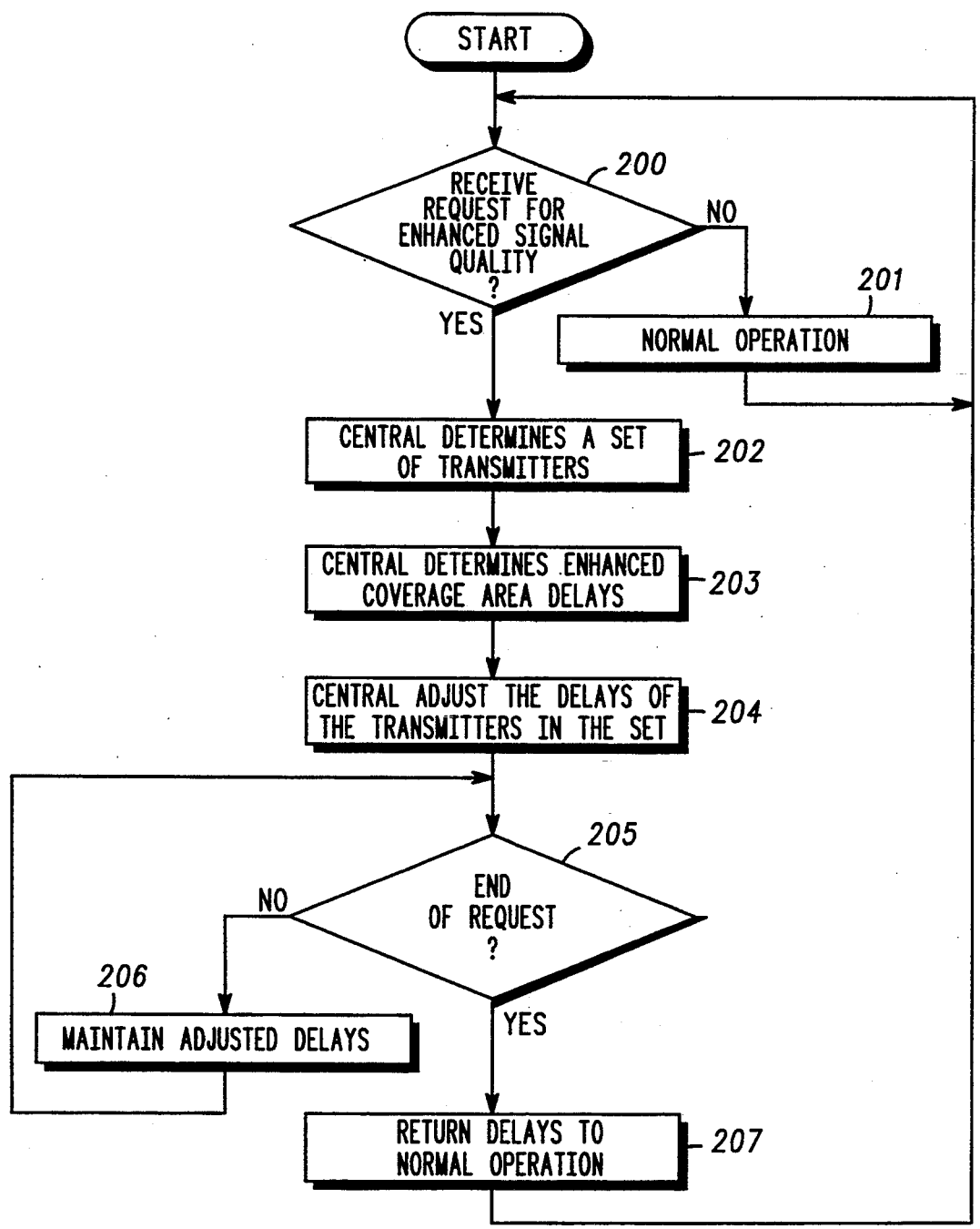
FIG. 2 illustrates a logic diagram that may be implemented in a simulcast communication system to incorporate the present invention.

FIG. 2 illustrates a logic diagram that may be implemented in the simulcast communication system (100) to incorporate the present invention. At step 200, the central simulcast controller (101) determines whether a request for enhanced signal quality has been received from a communication unit (110–115). This request can take many forms. The most simple form may be a verbal request to an operator of the central simulcast controller (101) stating the general location of the communication unit (110–115) such as the nearest intersection or mailing address. The operator could translate this verbal information to digital information by typing a command or toggling a switch. Alternatively, the request may be transmitted digitally by the communication unit (110–115) and contain information pertaining to the location of the communication unit (110–115), e.g., a GPS receiver coupled to the communication unit (110–115) provides digital representations of coordinates of the communication unit (110–115). Upon receiving this location information, the central simulcast controller (101) can access a database containing coordinate information to translate the request into geographical information understood by the central simulcast controller (101).

In yet another form of requesting enhanced signal quality, the communication unit (110–115) may simply transmit the request for enhanced coverage area and let the central simulcast controller (101) discern it's location. This is accomplished by measuring the arrival time of the request at each transmitter (110–115) in the system with the aid of the local absolute time reference. With this information, the central simulcast controller (101) can effectively triangulate the position of the communication unit (110–115). Regardless of the request method, the central simulcast controller (101) would acquire both the logical request and the location information before proceeding to step 202. If no request is received, processing continues at step 201.

At step 201, the communication system continues normal operation. Normal operation (201) typically prescribes that the central simulcast controller (101) set all transmit delays to be equal (i.e., normal operation delays). Thus, all transmitters (102–109) receive identical transmit launch times and begin transmitting the RF signal at substantially the same moment. This will usually produce the largest coverage area of good signal quality. There may be small areas of poor signal quality, however, found within the larger coverage area. For instance, communication unit (111) may receive strong signals from the nearest transmitters (102–104), while the signals from more distant transmitters (105–109) are all too weak to be received. Communication unit (111), as shown in FIG. 1, may be said to be in a good coverage area because it's relative distance to transmitters (102–104) is approximately equal and the more distant transmitters (105–109), which would contribute to poor signal quality, are too weak to be received. Conversely, if communication unit (113) receives strong signals from transmitters (102, 105, 107, 108), while all other transmitters are too distant, communication unit (113) may be said to be in a poor coverage area because the relative distance between transmitter (105) and transmitter (102) is great and contributes to a large differential delay.

Assuming that a request was received (200), the central simulcast controller (101) chooses a set of transmitters (202) that significantly affect the signal strength where the communication unit is located. In the simplest case, all transmitters (102–109) in the system (100) may be considered as part of the set, however, it is typically desirable to choose a smaller set. For instance, if the enhanced signal quality request came from communication unit (113), the central simulcast controller (101) may only choose to include transmitters (102, 105, 107, 108) in the set because they are the only transmitters which have adequate transmit signal strength to influence the signal quality in the vicinity of communication unit (113). Alternatively, the set may be pre-established based on the location of the communication unit (113).

Having chosen the set of transmitters, the central simulcast controller (101) will determine an enhanced coverage area delay for each transmitter in the set of transmitters (203) such that enhanced signal quality will be obtained at the desired location. Continuing with the previous example, the set of transmitters (102, 105, 107, 108) must be adjusted to enhance signal quality in the area in which communication unit (113) is operating. Thus, in a preferred embodiment, each of the delays at transmitters (105, 107, 108) is increased to compensate for the greatest propagation delay produced by transmitter (102). The enhanced coverage area delay values can be calculated by the RF propagation delay, as is known in the art, from each transmitter's (105, 107, 108) location to desired enhancement location. In addition, the enhanced coverage area delays can be calculated and stored in a table as predetermined information for specific locations for later retrieval.

Alternatively, the relative arrival times of the enhancement request at the central simulcast controller (101) may be used to calculate the delays. For example, a request for signal quality enhancement from communication unit (113) would arrive later at transmitter (102) than transmitters (105, 107, 108). The arrival time for each transmitter (105, 107, 108) is inversely proportional to their required enhanced coverage area delays. Furthermore, the arrival times of subsequent transmissions from the requesting communication unit (113) may be averaged to improve the delay calculation or possibly track the movement of the communication unit (113). Similarly, when multiple communication units are present in the requested region, the relative arrival times of RF signals from these units may be averaged to produce group location delay information. The group location delay information is used to calculate the appropriate enhanced coverage area delays. In yet another embodiment, the enhanced coverage area delays are calculated based on received signal quality information constantly transmitted by the requesting communication unit (113). Using this information as feedback, the central simulcast controller (113) can continually adjust the enhanced coverage area delays to maximize signal quality.

At step 204, the central simulcast controller (101) adjusts the delays of the transmitters in the set of transmitters with the enhanced coverage area delays 0 selected for enhanced coverage. Several methods can be used for adjusting these delays. In a first method, the central simulcast controller (101) creates a unique absolute launch time for each transmitter by adding on the delay to the normal launch time. In another method, the central simulcast controller (101) distributes each of the enhanced coverage area delays over the network, via a special command message, to each transmitter in the set of transmitters. Each transmitter then calculates it's own launch time from it's respective enhanced coverage area delay and the normal launch time. Once the respective delays have been adjusted, the system (100) continues to operate in the enhanced state (206) until a terminating condition arises (205).

Termination of the enhanced state can be triggered by several different events depending on system requirements. In a first method, an operator of the central simulcast controller (101) determines that the enhanced coverage area is no longer required and disables the state. For example, if the original request for enhanced coverage area came as result of an emergency condition, such as an auto accident, the operator can determine if the condition has been resolved, i.e., the accident site has been cleared. In another method, a communication unit transmits an end of enhanced mode request, which signals the central simulcast controller (101) to disable the state. The end of enhanced mode request could proceed a request for enhancement by another communication unit at another location. Simpler still, a predetermined period of time, such as ten minutes, can elapse since the original request for enhanced coverage area, at which point the central simulcast controller (101) disables the state. Regardless of the method or combination of methods used to terminate the enhanced coverage, the central simulcast controller (101) always returns the delays for each transmitter of the set of transmitters to normal operation delays (207), as described previously.

Figure 3:
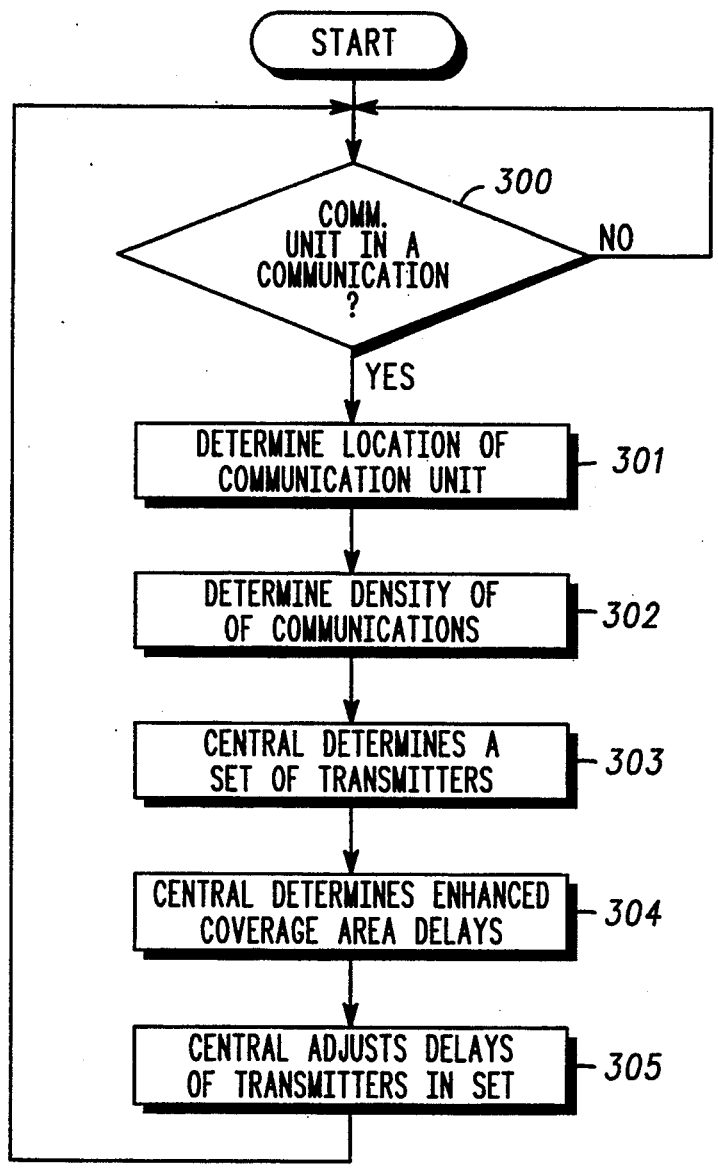
FIG. 3 illustrates a logic diagram of an alternate implementation of the present invention that may be incorporated in a simulcast communication system.

FIG. 3 illustrates a logic diagram of an alternate implementation of the present invention that could be incorporated in the simulcast communication system (100). At step 300, the central simulcast controller (101) monitors the communication system (100) and logs which communication units (110-115) access the system (100). A communication unit (110-115) accesses the system by simply transmitting voice or data which is captured by multiple transmitters (102-109), causing their arrival times to be recorded. The central simulcast controller (101) determines the location of each communication unit that accesses the system (301) in a manner similar to those described above with reference to step 200 of FIG. 2. This location information is stored and used by the central simulcast controller (101) to identify regions in which a high density of communications is occurring (302). For example, if communication unit (112) and communication unit (115) are carrying on a voice conversation and all other communication units (110, 111, 113, 114) are inactive, the central simulcast controller (101) would identify the area containing both communication unit (112) and communication unit (115) as requiring enhanced coverage.

Upon determining the region of enhanced coverage (302), the central simulcast controller (101) selects the set of transmitters to enhance signal quality in the desired area (303) in the same manner as that described above with reference to step 202 of FIG. 2. At step 304, the central simulcast controller (101) determines, in a manner identical to step 203 of FIG. 2, enhanced coverage area delays for the set of transmitters. The central simulcast controller (101) adjust the delays of the transmitters in the set (305) in the same manner as step 204 of FIG. 2, after which the process continues at step 300.

The present invention provides methods for enhancing signal quality in specific areas of a simulcast communication system. In prior art simulcast communication systems, the system was designed to provide a wide area of coverage, however, due to the overlapping coverage areas of the transmitters, transmitted signals destructively interfere with each other in certain areas of the system, thus producing low signal quality in these areas. The present invention eliminates these low signal quality areas by adjusting transmission delay time of the transmitters, such that the signals transmitted by the repeaters do not destructively interfere with each other in these areas.

We claim:

1. In a simulcast communication system that includes transmitters, a plurality of communication units, and a central simulcast controller, wherein the transmitters are synchronized via the central simulcast controller to transmit messages simultaneously, a method for providing an enhanced coverage area within the simulcast communication system, the method comprises the steps of:
    a) requesting, by a communication unit of the plurality of communication units, enhanced signal quality, wherein the request includes information pertaining to location of the communication unit;
    b) upon receiving the request, identifying, by the central simulcast controller, a set of transmitters for the location of the communication unit;
    c) determining, by the central simulcast controller, enhanced coverage area delays for each transmitter in the set of transmitters to produce respective delays for the each transmitter in the set of transmitters; and
    d) adjusting, by the central simulcast controller, delays of the each transmitter in the set of transmitters to the respective delays wherein the respective delays cause transmitted signal quality to be enhanced at the location of the communication unit to produce the enhanced coverage area.

2. In the method of claim 1, step (b) further comprises identifying the set of transmitters based on the information pertaining to location of the communication unit.

3. In the method of claim 1, step (b) further comprises identifying the set of transmitters based on transmit signal strength of the transmitters.

4. In the method of claim 1, step (c) further comprises determining the enhanced coverage area delays for the each transmitter based on predetermined information for specific locations.

5. In the method of claim 1, step (c) further comprises determining the enhanced coverage area delays for the each transmitter based on received signal quality information transmitted by the communication unit.

6. In the method of claim 1, when multiple communication units are substantially collocated with the communication unit, step (c) further comprises determining the enhanced coverage area delays for the each transmitter based on the location of the communication unit and location of the multiple communication units.

7. The method of claim 1 further comprises the step of:
   e) when a predetermined period of time has elapsed, adjusting, by the central simulcast controller, the delays of the each transmitter to normal operation delays.

8. The method of claim 1 further comprises the steps of:
   e) transmitting, by the communication unit, an end of enhanced mode request; and
   f) upon receiving the end of enhanced mode request, adjusting, by the central simulcast controller, the delays of the each transmitter to normal operation delays.

9. The method of claim 1 further comprises the steps of:
   e) receiving, from an operator of the central simulcast controller, an indication that the enhanced coverage area is no longer required; and
   f) adjusting, by the central simulcast controller, the delays of the each transmitter to normal operation delays.

10. In a simulcast communication system that includes transmitters, a plurality of communication units, and a central simulcast controller, wherein the transmitters are synchronized via the central simulcast controller to transmit messages simultaneously, a method for providing an enhanced coverage area within the simulcast communication system, the method comprises the steps of:
    a) monitoring, by the central simulcast controller, location of communication units of the plurality of communication units during communications;
    b) determining, by the central simulcast controller, locations having a high density of communications based on the location of communication units;
    c) determining, by the central simulcast controller, a set of transmitters based on the locations having the high density of communications;
    d) determining, by the central simulcast controller, enhanced coverage area delays for each transmitter in the set of transmitters to produce respective delays for the each transmitter in the set of transmitters; and
    e) adjusting, by the central simulcast controller, delays of the each transmitter in the set of transmitters to the respective delays wherein the respective delays cause transmitted signal quality to be enhanced at the locations having a high density of communications to produce the enhanced coverage area.

11. In the method of claim 10, step (a) further comprises monitoring the location of communication units during communications, wherein the communications include transmitting information pertaining to the location of the communication units.

12. In the method of claim 10, step (c) further comprises identifying the set of transmitters based on transmit signal strength of the transmitters.

13. In the method of claim 10, step (d) further comprises determining the enhanced coverage area delays for the each transmitter based on received signal quality information transmitted by the communication units.

14. In a simulcast communication system that includes transmitters, a plurality of communication units, and a central simulcast controller, wherein the transmitters are synchronized via the central simulcast controller to transmit messages simultaneously, a method for providing an enhanced coverage area within the simulcast communication system, the method comprises the steps of:
    a) transmitting, by a communication unit of the plurality of communication units, a request for enhanced signal quality;
    b) determining, by the central simulcast controller, location of the communication unit;
    c) upon determining the location of the communication unit, identifying, by the central simulcast controller, a set of transmitters for the location of the communication unit;
    d) determining, by the central simulcast controller, enhanced coverage area delays for each transmitter in the set of transmitters to produce respective delays for the each transmitter in the set of transmitters; and
    e) adjusting, by the central simulcast controller, delays of the each transmitter in the set of transmitters to the respective delays wherein the respective, delays cause transmitted signal quality to be enhanced at the location of the communication unit to produce the enhanced coverage area.

15. In the method of claim 14, step (b) further comprises determining the location of the communication unit based on delay differences of the request for enhanced coverage area, wherein the delay differences indicate relative distance of the communication unit from the transmitters.

16. In the method of claim 14, step (c) further comprises identifying the set of transmitters based on transmit signal strength of the transmitters.

17. In the method of claim 14, step (d) further comprises determining the enhanced coverage area delays for the each transmitter based on predetermined information for specific locations.

18. In the method of claim 14, step (d) further comprises determining the enhanced coverage area delays for the each transmitter based on received signal quality information transmitted by the communication unit.

* * * * *